United States Patent [19]

Taulier et al.

[11] 4,076,587
[45] Feb. 28, 1978

[54] FUSE AND APPLICATION OF SAID FUSE TO THE CONSTRUCTION OF AN EMERGENCY SHUTDOWN SYSTEM FOR A NUCLEAR REACTOR

[75] Inventors: Hubert Henri Léon Taulier, Maisons Laffitte; Gérard Brugeille, Chatou, both of France

[73] Assignee: Electricite de France (Service National), Paris, France

[21] Appl. No.: 662,911

[22] Filed: Mar. 1, 1976

Related U.S. Application Data

[62] Division of Ser. No. 469,907, May 14, 1974, Pat. No. 3,981,598.

[51] Int. Cl.² .............................................. G21C 7/12
[52] U.S. Cl. ............................ 176/86 R; 176/DIG. 5
[58] Field of Search ............ 176/22, 36 R, 86, DIG. 5

[56] References Cited

U.S. PATENT DOCUMENTS

| | | | |
|---|---|---|---|
| 2,919,236 | 12/1959 | Zinn | 176/DIG. 5 |
| 3,115,453 | 12/1963 | Paget et al. | 176/DIG. 5 |
| 3,177,124 | 4/1965 | Eggen et al. | 176/DIG. 5 |
| 3,795,580 | 3/1974 | Schively | 176/DIG. 5 |

FOREIGN PATENT DOCUMENTS 763,039   7/1967   Canada .............................. 176/86 R

OTHER PUBLICATIONS

KAPL-M-LBV-7, 9/55, by Vandenberg, pp. 3-6, 25, 32.
"Constitution of Binary Alloys", 1958, by Hansen, pp. 143, 144, 633-636, 728, 729, 1182.
NAA-SR-1954, 1956, pp. 3, 20.

*Primary Examiner*—Harvey E. Behrend
*Attorney, Agent, or Firm*—Cameron, Kerkam, Sutton, Stowell & Stowell

[57] ABSTRACT

A fuse device for an automatic emergency shutdown system in fast reactors provides a coupling between a casing tube placed within a fuel can and a series of neutron-absorbing masses held together above the reactor core under normal operating conditions but released in free fall to the lower portion of the casing tube at the level of the reactor core as a result of melting of the fuse when operating characteristics such as temperature or neutron flux attain a level which exceeds a predetermined threshold.

5 Claims, 3 Drawing Figures

FUSE AND APPLICATION OF SAID FUSE TO THE CONSTRUCTION OF AN EMERGENCY SHUTDOWN SYSTEM FOR A NUCLEAR REACTOR

This is a division, of application Ser. No. 469,907, filed May 14, 1974, now U.S. Pat. No. 3,981,598.

This invention relates to a fuse and to the application of said fuse to the construction of an emergency shutdown device for nuclear reactors.

In more exact terms, this invention is concerned with a device which serves to couple two components together when the complete assembly is placed in an ambient medium having so-called normal characteristics; by way of example, these characteristics can be the temperature or the neutron flux existing in the ambient medium (reactor core). When said characteristics attain a level which exceeds a pre-established threshold, the device breaks spontaneously as a result of melting of the fuse and this may in turn result, for example, in dropping of one of the two attached components.

The present invention is also concerned with the application of fuses of this type to the construction of an emergency shutdown device for a liquid sodium cooled fast neutron reactor. The intended function of said device is to shut down the reactor automatically and without any manual operation when a fault condition is liable to cause meltdown of the reactor core fuel elements. More precisely, said device comes into operation in the event of an abnormal increase in the neutron flux within the reactor core or in the event of an abnormal increase in the coolant sodium temperature at the outlet of the fuel elements. In other words, said device must come into operation in the event of an abnormal increase both in the temperature and in the neutron flux within the reactor core. There can be chosen as a trip threshold the doubling of the flux within the reactor core and a temperature of 800° C in the case of the sodium.

It is known that the most simple means of producing the negative reactivity which is necessary for reactor shutdown consists in introducing a neutron-absorbing element into the reactor core under the action of gravity, said element being maintained outside the core during normal operation. Said element therefore does not come into action prior to overstepping of these thresholds. One design of aluminum fuse already exists in which a charge of neutron-absorbing material suspended above a free channel of the reactor core is securely attached to a fixed portion of the reactor. During normal operation, the aluminum fuse melts at a temperature below 800° C. It is found in practice that, at the normal operating temperature of the reactor (560° C), the fuse exhibits creep which is liable to cause tripping of the emergency shutdown system before the proper time. It is known that creep is a slow process of deformation which results from the repetition of stresses applied to a part.

The precise aim of the present invention is to provide a fuse which overcomes the disadvantages mentioned in the foregoing and which is in particular not sensitive to creep stress.

The fuse in accordance with the invention or, in other words, the device for providing a coupling between two components of elongated shape, said coupling being capable of breaking if a given characteristic of the space in which said device is placed oversteps a predetermined threshold value, is characterized in that it comprises a first element for providing a mechanical connection between the two components, said element being formed of material which retains its mechanical properties when said characteristic is below the threshold value, and a second element formed of material which is capable of melting when said characteristic attains said threshold value and of giving rise when in contact with the material constituting the first element to an exothermic reaction with said material so as to produce a temperature which is higher than the melting point of the material constituting the first element or to the formation of an alloy having a melting point below the threshold value, the first element being intended to take up with respect to the second element a position which is such as to ensure that the two elements are separated when said characteristic is below said threshold value and that said materials are in contact with each other after melting of the material constituting the first element.

In other words, the fuse is constructed in two parts. The first element provides the mechanical connection between the two parts. Said first element is formed of material (preferably calcium) which wholly retains its mechanical properties when the characteristic under consideration is equal to or even slightly higher than the operating threshold of the reactor. It can thus be ensured that no spurious reactor trips are liable to take place under the action of creep. The fuse is also constituted by a second element which is intended to melt when the characteristic attains the limiting trip threshold of the device. In a preferred form of construction, the second element mentioned in the foregoing is aluminum but is not limited solely to this substance. As a result of melting, said second element comes into contact with the first element and produces an exothermic reaction with this latter. This causes the disappearance of the mechanical properties of the first element and therefore has the effect of breaking the connection existing between the two components. This accordingly forestalls any danger of spurious trips under the action of creep since the second element would be liable to be subjected to this stress whereas said second element does not perform any function from the point of view of the mechanical connection. In the event that substances other than aluminum are employed, for example magnesium or barium, these substances produce with calcium an alloy having a melting point which is below the trip threshold.

Said fuse can be adapted to initiate uncoupling of the two components either when the selective characteristic is the temperature or when the selected characteristic is the neutron flux existing for example in the reactor core.

In this first case, the second element is simply constituted, for example, by an aluminum cylinder having a melting point which is substantially equal to the temperature at which the safety system is intended to trip. Should it be found desirable to ensure that melting of the fuse takes place under the action of a given neutron flux, the second element is formed of aluminum, for example, particles which are capable of producing a fission reaction under the action of a given neutron flux having been introduced into said element. The fission of these particles causes a temperature rise which results in melting of the aluminum and this latter in turn enters into reaction with the calcium so as to initiate melting of the fuse.

The invention is also concerned with the application of the fuse to the construction of an emergency shutdown system for a liquid sodium cooled fast reactor, said system which is placed within a fuel assembly being characterized in that it comprises a leak-tight casing tube of substantial length filled with inert gas and within said casing tube in the downward direction a cylinder made of the second material and fixed inside said casing tube, a pellet made of the first material and fixed inside said casing tube, a space being formed between said pellet and said cylinder, a metallic wire which is disposed along the axis of said casing tube and the upper extremity of which is anchored in the pellet and the lower extremity of which is anchored in a second pellet made of the first material, the second pellet being fitted with a cup on the bottom end-face thereof, said wire being surrounded freely between the two pellets in the downward direction by the following elements: a cylindrical ballast-weight, a plurality of masses made of neutron-absorbing material, a spacer tube provided with an annular flange at the lower end thereof and placed between the lowermost of the masses aforesaid and the second pellet, said spacer tube being surrounded at the lower end thereof by a component of generally cylindrical shape which is provided with radial fins, said component being applied against said annular flange by means of the bottom end-face thereof and provided with a downward extension in the form of a sleeve surrounding the second pellet, said component of generally cylindrical shape being made of the second material, said sleeve which forms an extension of said cylindrical component being additionally constituted by particles which generate heat under the action of a neutron flux.

A better understanding of the invention will in any case be obtained from the following description of a number of embodiments of the invention which are given by way of example without any limitation being implied, reference being made to the accompanying drawings in which.

Figure 1:
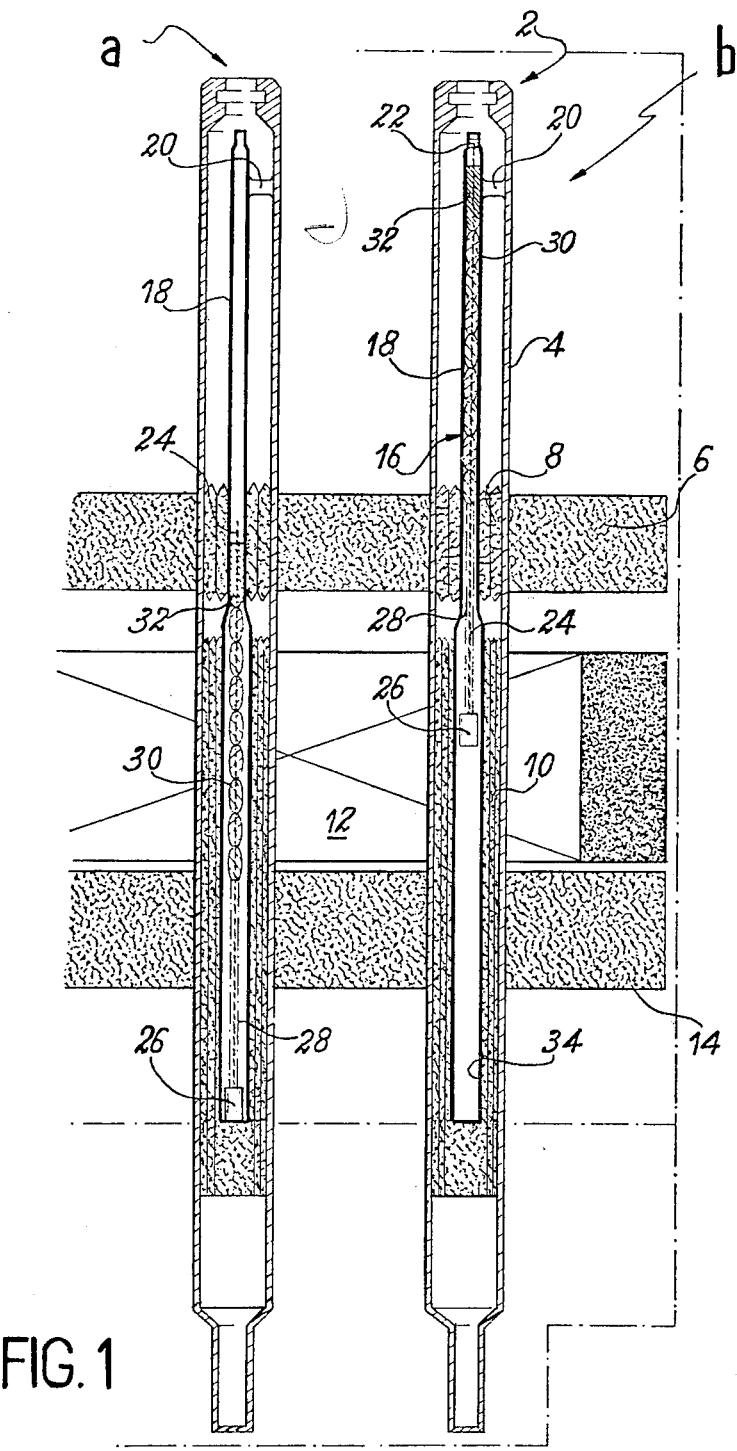
FIG. 1 is a view in vertical sectional elevation showing a portion of the reactor core in which the safety device has been placed.

There are shown in FIG. 1 the emergency reactor shutdown system and the location of this latter within a liquid sodium cooled reactor. The reference 2 designates a fuel assembly which is enclosed in a known manner within a fuel can 4 in which are shown elements 8 of the top fertile blanket 6 of the reactor core and fuel pencils as designated by the reference 10 which constitute the reactor core 12 proper, provision being made beneath this latter for the bottom fertile blanket 14. The liquid sodium which constitutes the primary heat-transporting fluid is circulated in the upward direction within the fuel can 4. Within the fuel assembly 2, the emergency shutdown device 16 proper takes up the position of top fertile blanket elements of the reactor core and of fuel pencils. Said device is surrounded by a leak-tight casing tube 18 which has a portion of increased diameter at the level of the reactor core. In this particular example of construction, said casing tube is advantageously made of stainless steel, has a hexagonal external cross-section and a circular internal cross-section and is filled with argon. Said casing tube 18 is rigidly fixed to the fuel assembly can 4 by means of a guide 20, for example, and by means of the grid which already serves to secure the fuel pencils. As shown diagrammatically, the emergency shutdown device is fitted at the top end with a fuse 22 which is sensitive to temperature. A stainless steel wire 24 is attached to said fuse and extends downwards to a level within the reactor core at which said wire supports a second fuse unit 26. A spacer tube 28, ten boron carbide elements such as the elements 30 and a steel ballast-weight 32 rest in this order on said second fuse 26. The fuse 22 which will be described in greater detail hereinafter is sensitive to temperature. In other words, when the temperature exceeds a preset threshold value the fuse 22 melts and detaches the wire 24 from the casing tube 18. This accordingly releases the complete series of boron carbide masses 30 and the ballast-weight 32 which fall to the bottom 34 of the casing tube 18 as shown in FIG. 1a. The length of the spacer tube 28 is such that, in the position shown in FIG. 1a, the series of boron carbide masses is located at the level of the reactor core 12. Moreover, in the normal position, the fuse 26 is located in the central region of the reactor core. The necessary negative reactivity is thus introduced for shut-down of the reactor.

The fuse 26 which will also be described below detaches the spacer tube 28 from the wire 24 when the neutron flux within the reactor core exceeds a predetermined threshold value. In this case, the spacer tube 28 becomes free with respect to the wire 24 and the complete assembly of boron carbide charges falls to the bottom 34 of the casing tube 18. It is readily apparent that in this position, the boron carbide charges 30 are also located at the level of the reactor core 12 at which the desired negative reactivity is introduced.

The constructional design of the fuse 22 will now be described in greater detail. The fuse comprises a first element 36 constituted by a small calcium cylinder weighing approximately 20 grams. The cylinder 36 is rigidly fixed to the tube-wall 18 of the shutdown device by means of the necked portions 38 and 38'. The top extremity 40 of the wire 24 is anchored within the cylinder 36. Said cylinder is capable of supporting the charge which is fastened to the wire 24 without undergoing any creep deformation since the melting point of said cylinder (850° C) is well above the normal operating temperature of the reactor (560° C). The fuse 22 also comprises a second element 42 constituted by an aluminum ingot which is placed above the cylinder 36. The element 42 is rigidly fixed to the casing tube 18 by means of the necked portion 38 which forms a space 44 between these two members.

Similarly, the bottom fuse 26 has a first element 46 consisting of a calcium cylinder in which is anchored the lower extremity of the wire 24. The cylinder 46 is fitted on the bottom end-face thereof with a cup 48 which is made of stainless steel, for example. Said cup 48 is connected to the spacer tube 28 by means of tie-rods (not shown in the drawings) which are passed through the calcium cylinder 46. Said bottom fuse also has a second element consisting of a cylinder 50 which is pierced by an axial bore 51 and is progressively flared in the downward direction. The cylinder 50 is provided over the greater part of its length with fins such as the fin 52 and has a downward extension consisting of a sleeve 54 forming a cylindrical cavity 56 in which is placed the cylinder 46. An annular flange 58 of stainless steel, for example, which is welded to the spacer tube 28 prevents any contact between the members 50 and 46.

The wire 24 and the spacer tube 28 are passed through the axial bore and the lower end of said spacer tube bears on the annular flange 58. The member 50 is advantageously made of aluminum. However, the sleeve 54 is formed of particles which generate heat under the action of the neutron flux.

The operation of the bottom fuse is as follows. During normal operation (normal flux), the quantity of heat generated by the heating particles is small and is removed by the fins 52. The temperature at the level of the fuse is of the order of 500° C and the sleeve 54 has a temperature in the vicinity of 600° C. Doubling of the neutron flux causes the sleeve 54 to melt and to be separated from its fins 52. The temperature of the sleeve accordingly rises and the aluminum enters into reaction with the calcium as it falls into the cup 48. The reaction continues as indicated in the foregoing and the fuse releases the neutron-absorbing charge.

Figure 2:
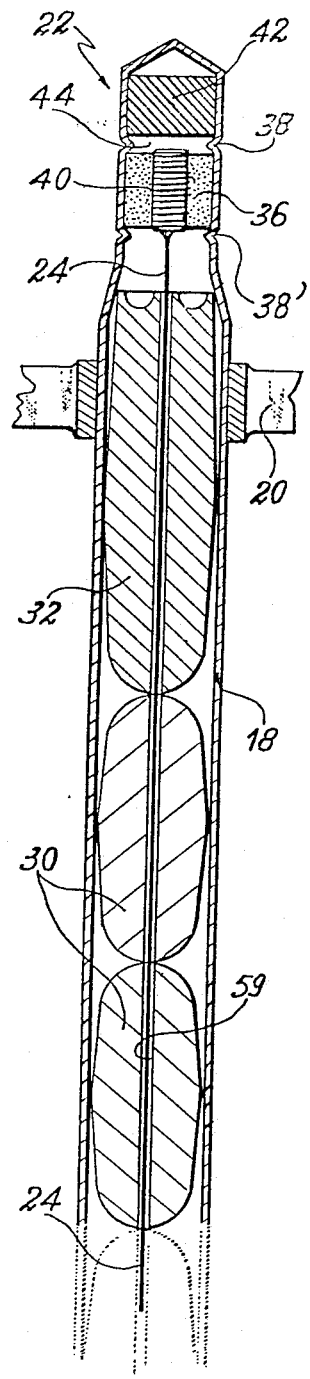
FIG. 2 is a vertical sectional view of a portion of the device and shows the top fuse.
Figure 3:
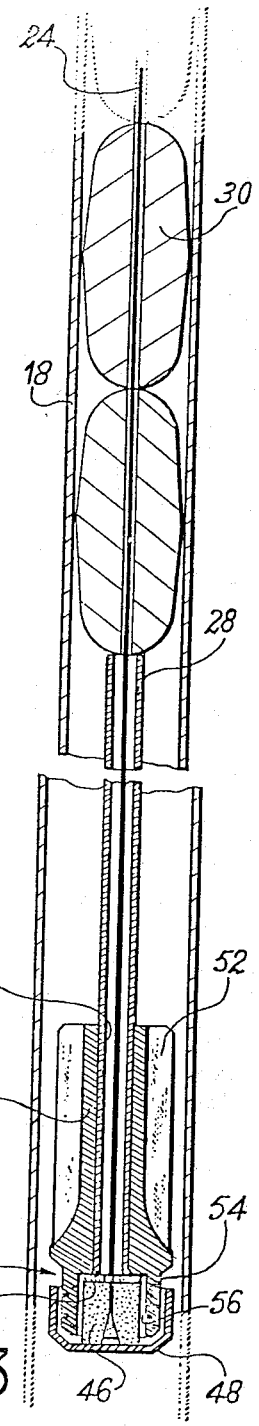
FIG. 3 is a view of the same device which is taken along the same section plane and shows the bottom fuse.

In FIGS. 2 and 3, there are also shown the masses 30 of neutron-absorbing material and the steel ballast-weight 32 which are passed over the wire 24 by virtue of the axial bores such as the bore 59.

In the case of the Phenix reactor, the neutron-absorbing material is constituted by ten masses of 143 grams of boron carbide 100% enriched in boron-10. Dropping of this charge into the reactor core produces a negative reactivity of approximately 600 milliniles.

In the foregoing description, it has been stated that the fuse elements were constituted by the aluminum-calcium pair. This pair appears to be the most suitable for three reasons:

(a) the fusions are obtained at the desired temperature levels, (b) the masses and therefore the thermal inertias are of small value, (c) these two substances are transparent to neutrons.

However, other pairs of metals have a substantially identical action. Suitable pairs which can be mentioned by way of non-limitative example are calcium-barium or calcium-magnesium, in which it is noted that calcium always forms the support.

It would also be possible to employ as a support the rare earths (lanthanum, cerium), in which the reactions of formation of alloys are sometimes violent, especially with zinc.

What we claim is:

1. A coupling device between two components of elongate shape, said device having a first state corresponding to the coupling of said components and a second state corresponding to the breaking of said coupling device, to initiate the shutdown of a fast nuclear reactor of the liquid sodium cooled type having a core region by the introduction by gravity of solid neutron absorbing material into the core region, said absorbing material being normally maintained above the core region by one of said two components when said coupling device is in the first state, said coupling device breaking if a given physical characteristic of the core region of the reactor exceeds a predetermined threshold value, so that said absorbing material falls into the core region, said coupling device comprising in combination with said nuclear reactor a first element, a second element and separating means between said first and second elements to physically separate said first and second elements, said first element providing a mechanical connection between the two components, said first element being a material which retains its mechanical properties when said physical characteristic is below said threshold value, said second element being a material generating heat when said physical characteristic attains said threshold value and causing when fused and in contact with the material of said first element an exothermic reaction with said material producing a temperature which is higher than the melting point of the material of said first element and also the formation of an alloy of the materials of said two elements, said alloy having a melting point below said threshold value, and said separating means separating said first element from said second element when said characteristic is below said threshold value and allowing contact of said materials of said first and second elements after melting of said material of said second element, said contact causing breaking of said coupling device corresponding to the second state and the fall by gravity of the neutron absorbing material into the core region of the nuclear reactor.

2. A device as described in claim 1 within a fuel assembly, wherein said device comprises as one of said components a leak-tight casing tube of substantial length filled with inert gas and within said casing tube in the downward direction a cylinder made of the second material and fixed inside said casing tube, a pellet made of the first material and fixed inside said casing tube, a space being formed between said pellet and said cylinder, the other of said components being a metallic wire which is disposed along the axis of said casing tube and the upper extremity of which is anchored in the pellet and the lower extremity of which is anchored in a second pellet made of the first material, the second pellet being fitted with a cup on the bottom end-face thereof, said wire being surrounded freely between the two pellets in the downward direction by the following elements, a cylindrical ballast-weight, a plurality of masses made of neutron-absorbing material, a spacer tube provided with an annular flange at the lower end thereof and placed between the lowermost of the masses aforesaid and the second pellet, said spacer tube being surrounded at the lower end thereof by a component of generally cylindrical shape which is provided with radial fins, said component with radial fins being applied against said annular flange by means of the bottom end-face thereof and provided with a downward extension in the form of a sleeve surrounding the second pellet, said component with radial fins being of the second material, said sleeve including particles which generate heat under the action of a neutron flux.

3. A device as described in claim 2, wherein the neutron absorbing material is boron carbide enriched to 100% in boron-10.

4. A fuel assembly emergency shutdown apparatus in combination with a fast neutron nuclear reactor having a core cooled by liquid sodium functioning at a given temperature, said apparatus being vertical and comprising a casing extending into the core, combustible fuel elements within said casing, a vertical sealed envelope of elongated form in said casing, and spaced in said envelope from top to bottom, a cylinder of material subject to melting when its temperature is greater than said given temperature, a cylindrical element fixed to said envelope beneath said cylinder and out of contact with said cylinder, said cylindrical element being of a material maintaining its mechanical properties when the temperature is less than said value and when in contact with the fused material of said cylinder creating an exothermic reaction producing a temperature greater than the temperature of fusion of the material constituting said cylindrical element, a wire disposed within and on the axis of said tube, an upper end of said wire being anchored in said cylindrical element and an assembly of masses of a neutron absorbant material mounted on a lower extremity of said wire to fall by gravity into the core when said cylindrical element is fused.

5. A fuel assembly emergency shutdown apparatus in combination with a fast neutron nuclear reactor having a core cooled with liquid sodium and functioning at a given neutronic flux, said assembly being vertical and comprising a casing extending into the core, fuel elements within said casing, a sealed vertical envelope of elongated form filled with inert gas in said casing, and spaced in said envelope from top to bottom, a vertical wire anchored at its upper end to said envelope, a plurality of masses of material absorbing neutrons, said masses being freely mounted on said wire, an element in which a lower extremity of said wire is secured, an intermediate tube between said masses and said element, an internal sleeve out of contact with said element, said sleeve grains heat by the action of a neutronic flux, a cup secured to a lower end of said element providing contact between the material of said sleeve after fusion and said element, said sleeve melting when the neutronic flux is greater than said given value and said masses of material absorbing neutrons then falling by gravity into the core.

* * * * *